United States Patent

[11] 3,600,974

| [72] | Inventors | Hans-Joachim Schwerdhofer;<br>Manfred Lutz; Horst Schulz, all of<br>Schweinfurt am Main, Germany |
|---|---|---|
| [21] | Appl. No. | 876,019 |
| [22] | Filed | Nov. 12, 1969 |
| [45] | Patented | Aug. 24, 1971 |
| [73] | Assignee | Fichtel & Sachs AG<br>Schweinfurt am Main, Germany |
| [32] | Priority | Nov. 15, 1968 |
| [33] | | Germany |
| [31] | | P 18 09 141.3 |

[54] MULTIPLE-SPEED DRIVE ARRANGEMENT WITH CENTRIFUGAL GOVERNOR
8 Claims, 18 Drawing Figs.

| [52] | U.S. Cl. | 74/752 E |
|---|---|---|
| [51] | Int. Cl. | F16h 5/42 |
| [50] | Field of Search | 74/759, 752 |

[56] References Cited
UNITED STATES PATENTS

| 3,143,005 | 8/1964 | Schwerdhofer | 74/752 |
| 3,492,893 | 2/1970 | Shimano et al. | 74/752 |
| 3,494,227 | 2/1970 | Shimano et al. | 74/752 |

*Primary Examiner*—Arthur T. McKeon
*Attorney*—Kelman and Berman

ABSTRACT: A dual-speed hub for a bicycle is equipped with planetary gearing and with first and second pawl-and-ratchet clutches respectively connecting the hub shell with the driver and planet carrier of the hub, and with the faster turning ring gear. The second clutch is normally disengaged by a centrifugal governor having spring-loaded, elongated flyweights. The motion for engaging the second clutch and for thereby shifting the hub into higher gear is derived from bosses or pins near the longitudinal end of each flyweight which is pivoted to a rotating carrier coupled to the driver.

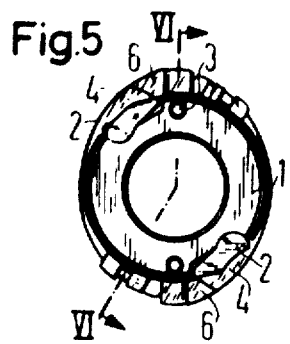
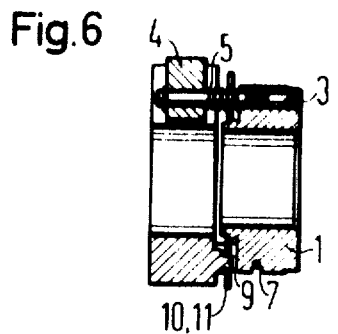
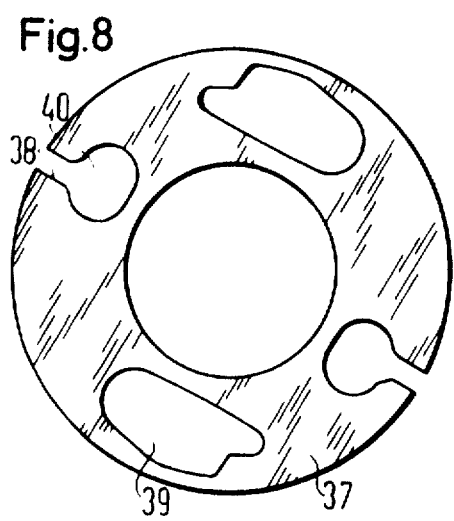
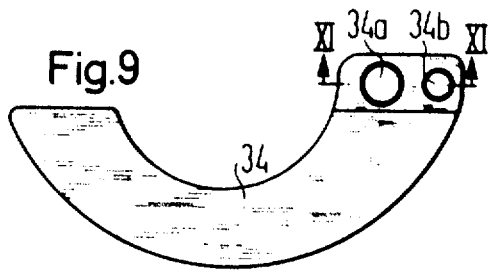
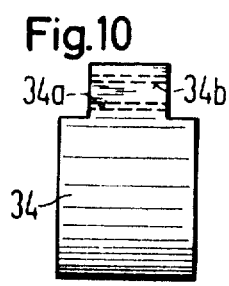
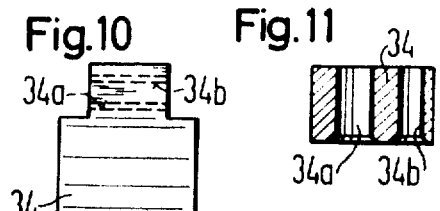
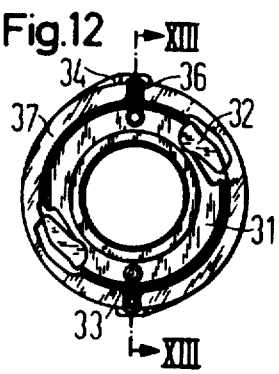
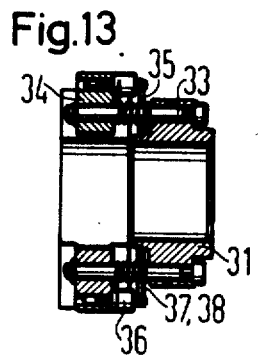

MULTIPLE-SPEED DRIVE ARRANGEMENT WITH CENTRIFUGAL GOVERNOR

This invention relates to multiple-speed drive arrangements, and particularly to centrifugal governors for changing the transmission ratio of a multiple-speed drive arrangement.

The invention will be described hereinbelow by primary reference to a multiple-speed hub for a bicycle or like vehicle, but other applications are also contemplated. It is known to equip multiple-speed hubs of bicycles with centrifugal governors whose flyweights are rotated about the hub axis by a driving connection either with the driver which is the input member of the hub, or with the hub shell which is the output member. The hub shell encloses a planetary gear transmission whose several gears rotate at different speeds. Pawl-and-ratchet clutches are interposed respectively between the hub shell and two of the gears. The hub shell rotates at the speed of the fastest connected gear, and the hub can be shifted to a lower speed by disengaging the clutch associated with the fastest gear.

The centrifugal governor is connected with the pawl or pawls of the last-mentioned clutch to keep the clutch disengaged unless the rotary speed of the flyweights reaches a value at which centrifugal forces can overcome the return springs of the flyweights so that the flyweights release the pawls for driving engagement with the associated ratchet.

In the commonly owned application of one of us, Ser. No. 838,524, now U.S. Pat. No. 3,557,922 filed on July 2, 1969 a governor has been disclosed in which two elongated flyweights are mounted on the pawl carrier for the associated clutch on closely juxtaposed pivot pins and swing in opposite angular directions in response to centrifugal forces. The flyweights are coupled to each other for simultaneous movement so as to prevent sudden translatory movement of the hub, as may be caused by an obstacle in the path of the wheel, from causing malfunctioning of the governor. The motion transmitting connection between the flyweights and the pawls of the associated clutch engages the end of the flyweight remote from the pivot.

It has now been found that friction absorbs a significant portion of the pawl setting force available from the flyweights of the earlier application, and that smaller flyweights can be used under otherwise comparable conditions if the motion transmitting train from each flyweight to the associated pawls begins at a motion transmitting member mounted on the flyweights adjacent the pivot axis at one longitudinal end of the flyweight, and remote from the other end of the flyweights. The motion transmitting member thus moves only through a small arc and friction losses at this point are minimal. The torque ultimately available for moving the pawls between the engaged and disengaged positions is significantly increased. The speed governor of this invention is therefor superior to the governor of the earlier application in its reliability particularly after extended periods of use when the governor becomes contaminated with foreign matter or its operation is impaired by aged lubricant.

Other features of this invention and additional attendant advantages will become apparent from the following description of preferred embodiments when considered with the appended drawing in which:

FIG. 5 shows the governor of the hub of FIG. 1 in side elevation;

FIG. 6 illustrates the device of FIG. 5 in section on the line VI—VI;

FIG. 8 is a side-elevational, enlarged view of a coupling element of the governor of FIG. 7;

FIG. 9 shows a flyweight of the governor of FIG. 7 in a view corresponding to that of FIG. 8;

FIG. 10 illustrates the device of FIG. 9 in enlarged rear elevation;

FIG. 11 is a sectional view of the device of FIG. 9 taken on the line XI—XI;

FIG. 12 shows the governor of the hub of FIG. 7 in side elevation;

FIG. 13 is a section of the governor of FIG. 12 taken on the line XIII—XIII;

Figure 1:
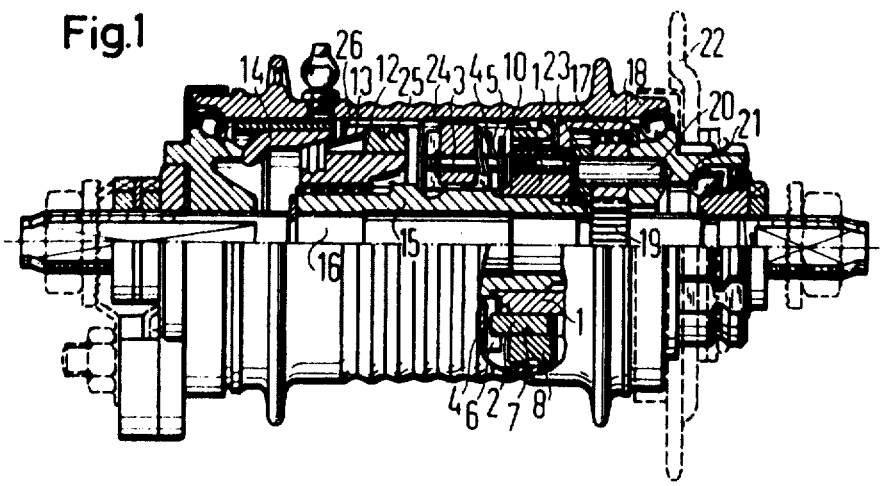
FIG. 1 shows a multiple-speed bicycle hub equipped with a centrifugal governor according to the invention in rear elevation and partly in axial section.

Referring now to the drawing in detail, and initially to FIGS. 1 to 6, there is seen a dual-speed hub for the rear wheel of a bicycle. The hub is normally mounted on the nonillustrated bicycle frame by means of a fixedly attached shaft 16. The nonillustrated rim of the wheel is attached to an approximately cylindrical shell coaxially rotatable about the shaft 16. The shell encloses a dual-speed transmission and is the output member of the transmission whose input member is driver 21 rotatable on the shaft 16 and carrying a sprocket 22.

Shafts 20 on the driver 21 carry two or more planet gears 18 which simultaneously mesh in the shell 24 with a sun gear 19 cut into the shaft 16 and an enveloping ring gear 17. A common retaining ring 23 axially secures the planet gears 18 on their shafts 20 and is splined to a sleeve 15. An annular pawl carrier 1 is coaxially rotatable on the sleeve 15 and carries two diametrically opposite pawls 2 movable in respective pockets of the outer carrier circumference. The pawls are retained in the respective pockets by a common annular wire spring 7 which biases each pawl toward driving engagement with a ratchet ring 8 fixed to the inner wall of the hub shell 24. The carrier 1 is splined to the ring gear 17 for joint rotation about the hub axis.

The end of the sleeve 15 remote from the driver 21 threadedly engages another annular carrier 12 for pawls 25 similar to the aforedescribed pawls 2 and biased toward engagement with a ratchet rim 26 on the inner wall of the hub shell 24. The conical movable member 13 of a coaster brake is mounted on the carrier 12 for conforming engagement with a brake member 14 secured on the shaft 16, when the carrier 12 moves toward the left from the position shown in FIG. 1.

As far as described so far, the illustrated hub is basically conventional in its structure and in its operation. As long as the pawls 2 engage the ratchet ring 8 and turn the hub shell 24 at the speed of the ring gear 17, which is higher than the input speed of the driver 21, the ratchet 26 on the hub shell overtravels the pawls 25 rotating at the speed of the driver 21 to which the sleeve 15 is coupled by the retaining ring 23. When the pawls 2 are disengaged from the ratchet ring 8, the hub shell is rotated by the pawls 25 at the lower input speed. When the driver 21 is rotated backwards, as by backpedaling the brake members 13, 14 are engaged by threaded movement of the carrier 12 on the sleeve 15.

This invention is concerned more specifically with a centrifugal governor which controls the engagement of the pawls 2 and the ratchet ring 8, and with the cooperation between the governor and the pawls.

Figure 2:
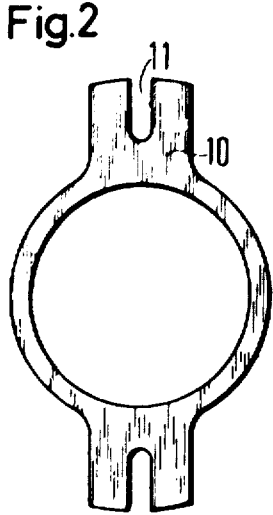
FIG. 2 shows a coupling element of the governor of FIG. 1 in enlarged side elevation.
Figure 3:
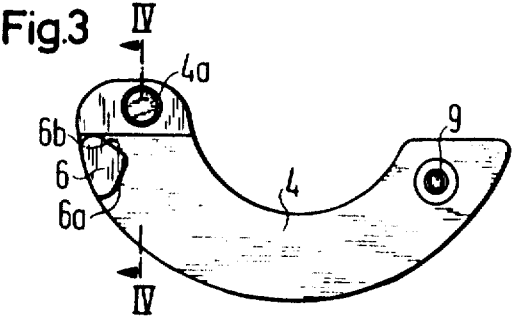
FIG. 3 illustrates a flyweight of the governor of FIG. 1 in a view corresponding to that of FIG. 2.
Figure 4:
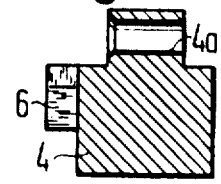
FIG. 4 shows the device of FIG. 3 in section on the line IV—IV.

As is best seen in FIGS. 2 to 6, two axial bores diametrically opposite each other near the outer circumference of the carrier 1 hold partly knurled pivot pins 3 by a press fit. A flyweight 4 is pivoted on each pin 3 and axially secured by a retaining clip. As is shown in FIGS. 2 and 3, each of the two identical flyweights 4 is basically a rod of rectangular cross section bent into an arc of almost 180°. One end of the flyweight is reduced in thickness and receives the pin 3. A boss 6 projects from the flyweight near the pin 3. The other end of the flyweight carries an axially projecting coupling pin 9, the boss 6 and coupling pin 9 being directed toward the pawl carrier 1. A wire spring 5 loosely coiled about the pin 3 biases each flyweight in an angular direction to hold the pin 9 near the axis of rotation of the carrier 1.

Respective axially opposite faces of the carrier 1 and of the flyweights 4 bound a narrow annular space which extends radially outward from a shoulder of the carrier 1 and receives a coupling disc 10 of sheet metal. The disc 10, as shown separately in FIG. 2, has an annular body portion from which lugs project in opposite radial directions. Radial slots 11 in the lugs are outwardly open.

As is shown in FIGS. 5 and 6, the body portion of the disc 10 has an inner diameter chosen for rotatable seating of the disc on the shoulder of the carrier 1, and an outer diameter to clear the pins 3, 9 which are located on a common circle about the carrier axis in the illustrated rest position of the hub, and the bosses 6 which are offset from the circle in a radially outward direction. The slots 11 respectively receive the coupling pins 9, and the lugs on the disc 10 are far enough from the pins 3 to permit a desired circumferential movement of the disc 10 relative to the carrier 1.

As is best seen in FIG. 3, each boss 6 is approximately triangular in section perpendicular to the axis of rotation of the carrier 1 and to the pivot axis of the flyweight 4. One side of the triangle is parallel to the outer circumference of the flyweight. The other two sides of the triangle are formed by respective faces 6a, 6b of the boss 6 which enclose an angle of approximately 90°. The face 6a cammingly engages the pawl 2 (see FIG. 5) during operation of the governor. It is approximately radial relative to the pivot axis of the flyweight, but extends in a shallow concave arc about an axis parallel to the pivot axis. As is evident from FIG. 5, this configuration facilitates camming cooperation of the boss 6 with the associated pawl 2.

The bosses 6 are integrally formed with the flyweight 4, and the unitary structure is conveniently produced by diecasting from a suitable zinc or lead alloy, or from powdered metal by sintering, the choice of metal in the sintered weight being very wide. A bore 4a is simultaneously formed for receiving the pivot pin 3. The pin 9 may also be formed integrally in the diecast or sintered flyweight, or be a separate member inserted in a bore of the flyweight.

In the illustrated position of the governor, the two bosses 6 respectively retain the tips of the pawls 2 in the pockets of the carrier 1 and prevent engagement of the pawls with the ratchet ring 8. When the joint rotation of the driver 21, the sleeve 15, and the carrier 1 about their common axis reaches a speed at which the centrifugal forces acting on the flyweights 4 can overcome the restraint of the springs 5, the flyweights wing in a common clockwise direction, as viewed in FIGS. 3 and 5, on their pivot pins 3, and thereby turn the coupling disc 10 in the same direction about the axis of hub rotation. The bosses 6 are withdrawn from the tips of the pawls 2, and the pawls are swung by the spring 7 into engagement with the ratchet ring 8.

When the rotary speed of the driver 21 exceeds a limit determined by the properties of the governor, the transmission ratio of the hub is thus increased. When the input speed of the driver 21 is decreased, or the driver is stopped, the flyweights are returned to the illustrated position, and the disc 10 is turned counterclockwise as viewed in FIG. 5. Cam faces of the bosses 6 obliquely inclined relative to corresponding radii on the hub axis engage the pawls 2 and again retract the pawls out of reach of the ratchet ring 8, as illustrated. The transmission ratio of the hub is thereby decreased to its original value.

The governor assembly on the carrier 1 is symmetrical relative to its axis of rotation in all operative positions of the flyweights 4. The flyweights are identical and interchangeable, as are the associated pivot pins 3 and return springs 5. The flyweights thus cannot upset the static and dynamic balance of the hub and can be manufactured at lower unit cost than two dissimilar flyweights.

Figure 7:
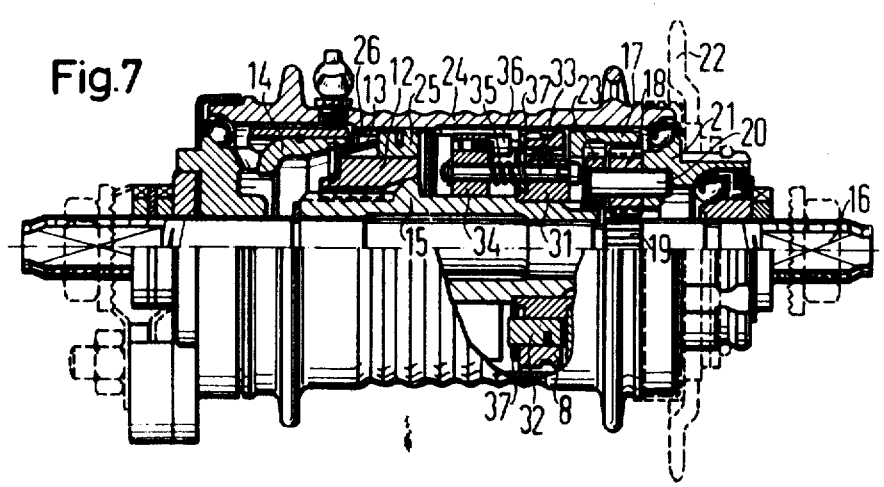
FIG. 7 shows the hub of FIG. 1 equipped with a modified governor in partly sectional rear elevation.
Figure 14:
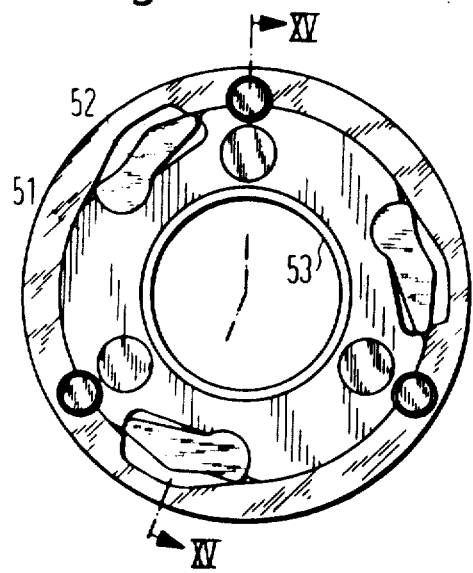
FIG. 14 is a side-elevational view of another centrifugal governor of the invention on a scale larger than that of FIGS. 5 and 12.
Figure 15:
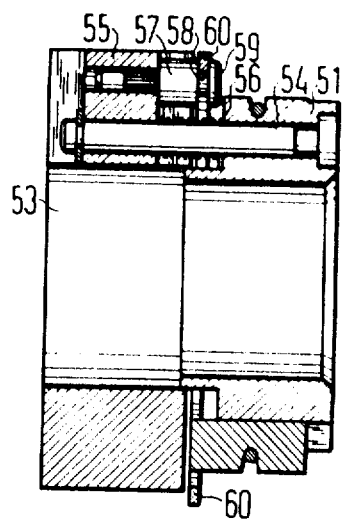
FIG. 15 is a section of the device of FIG. 14 on the line XV—XV.
Figure 16:
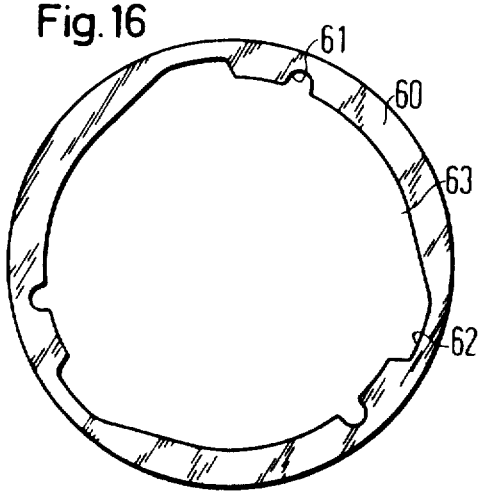
FIG. 16 shows a control element of the governor of FIG. 14 in a corresponding view.
Figure 17:
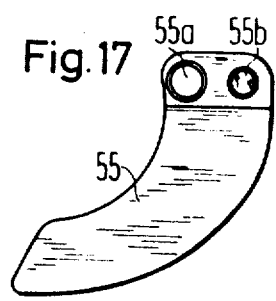
FIG. 17 illustrates a flyweight in the governor of FIG. 14 in side-elevation.
Figure 18:
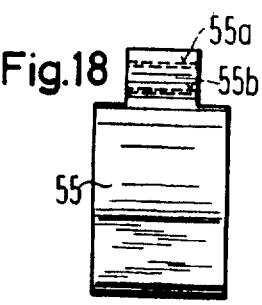
FIG. 18 is a side-elevational view of the flyweight of FIG. 17.

The two-speed hub illustrated in FIG. 7 is identical with the aforedescribed hub except for its centrifugal governor and details in the configuration of the pawls whose engagement is controlled by the governor. The description of the second embodiment will thus be limited to the governor and closely associated elements, seen in detail in FIGS. 8 to 13. The elements common to FIGS. 1 and 7 are designated by the same numerals in both FIGS. and do not require repeated description.

The pawl carrier 31 which is connected to the ring gear 17 carries two pawls 32 in a diametrically opposite, circumferential pockets in which they are held by the pawl spring 7. Diametrically opposite, axial pins 33 are slidably received in corresponding bores of the carrier 31 and are each secured against axial movement in one direction by an enlarged head, and against movement in the opposite direction by a flyweight 34 retained by a spring clip on the pin 33. The flyweights 34 are similar to the weights 4 in being of rectangular cross section and extending in an arc of almost 180° about the hub axis in the normal illustrated position toward which they are biased by a return spring 35 coiled about each pin 33.

As is best seen in FIG. 12, the pawls 32 and flyweights 34 are mounted on the pawl carrier 31 in an arrangement which is symmetrical relative to the axis of rotation of the carrier, each pawl being offset about 60° from the nearest pin 33.

Each of the two identical flyweights 34 is provided with a bore 34a for the associated pivot pin 33 and adjacent thereto with another bore 34b in which a control pin 36 of stepped cylindrical shape is normally held firmly by a friction fit in radial alignment with the pin 33 relative to the axis of pawl carrier rotation in the illustrated rest position and relative to the axis of curvature of the inner flyweight face. The pins 36 project axially from the associated weights 34 toward the carrier 31 and are received in radial slots 38 in the circumference of a flat annular coupling and control disc 37 of sheet metal rotatably mounted on a shoulder of the carrier 31 between closely adjacent, opposite, radial faces of the carrier and of the flyweights 34. The disc 37 thus couples the flyweights 34 for joint movement on their respective pivot pins 33 either under the influence of centrifugal forces or under the influence of their return springs 35.

Apertures 39 are arranged in the disc 37 for receiving edge portions of the pawls 32 (FIG. 12). The walls of the apertures 39 cammingly engage the pawls during pivoting movement of the flyweights 34 toward the axis of rotation of the carrier 31 to withdraw the pawls from engagement with the ratchet ring 8, and to lock the pawls in the retracted position as shown in FIG. 12. When the disc 37 is turned clockwise, as seen in FIG. 12, by the flyweights 14 pivoting away from the axis of rotation against the restraint of their return springs 35, the disc 37 releases the pawls 32 for driving engagement with the ratchet ring 8 on the hub shell 24.

The radially inner ends 40 of the slots 38 (FIG. 8) are circumferentially enlarged, and are outside the path of the control pins 36. The pivot pins 33 pass through the enlarged slot portions 40 with sufficient circumferential clearance to permit the desired angular movement of the disc 37 on the pawl carrier 31. The central opening 41 of the disc 37 matches the shoulder of the carrier 31.

The third centrifugal governor of the invention shown in FIGS. 14 to 18 is interchangeable in the hub of FIGS. 1 and 7 with the aforedescribed governors. A carrier 51 is provided with three equiangularly spaced pockets in which respective pawls 52 are secured by a pawl spring 64 biasing the pawls radially outward toward engagement with the ratchet ring 8, not itself shown in FIGS. 14 to 18.

A central axial bore 53 in the carrier 51 normally receives the sleeve 15 and the shaft 16. Three pins 54, closely similar to the pins 33, project axially from a radial end face of the carrier 51 at distances of 120 from each other and carry respective flyweights 55 which differ from the flyweights 34 mainly by their reduced arcuate length necessitated by the provision of three, rather than two flyweights. Each flyweight 55 is provided with a return spring 56 and extends from its pivot pin 54 mainly in a clockwise direction, as viewed in FIG. 14.

An axial bore 55b offset in each flyweight 55 in a radially outward direction from the bore 55a receiving the pivot pin 54 is tightly engaged by a reduced axial end portion of a control pin 57 which is formed with an annular, circumferential groove 58 closely adjacent the other axial end 59 of the control pin.

The several flyweights 55 are coupled to each other, and the pawls 52 are controlled by a radially narrow coupling and control disc 60 of sheet steel whose central opening 63 is large enough to receive the pawls 52 and the pivot pins 54. Three equiangularly spaced inwardly open radial notches 61 in the disc 60 respectively engage the three control pins 57, the edges of the notches being dimensioned for a sliding fit about the reduced part of each pin 57 in the groove 58 of the latter so that the disc 60 is radially and axially secured on the pins 57. The bottom of each notch 61 is semicylindrical for conforming engagement with the associated control pin 57. Three cam faces 62 on the inner circumference of the ring 60 cammingly cooperate with the pawls in the manner described above for retracting the pawls from the associated ratchet ring 8 or for releasing the pawls for engagement with the ring 8 under the biasing force of the common pawl spring 64.

The embodiment illustrated in FIGS. 14 to 18 is representative of centrifugal governors of the invention having more than two flyweights and more than two pawls, and the number of flyweights may be further increased beyond three while maintaining all basic features of the last-described embodiment. Even with four or more control pins corresponding to the pins 57, the bearing friction on the control and coupling disc 60 or its equivalent is particularly low as compared to a disc journaled on the shoulder of the pawl carrier, a feature important in permitting a reduction in the mass of the flyweights without reduction in the effective force available for switching the pawls.

The number of pawls need not necessarily be identical with the number of flyweights. Two pawls may be used in an obvious manner with four flyweights, and a wider choice in the number of pawls is available with six flyweights whose pivot axes are equiangularly spaced about the axis of rotation, and which all swing in a common first angular direction under the influence of centrifugal forces and are biased in a common second angular direction by their respective return springs. Not each flyweight need be provided with an individual return spring because of the coupling of the flyweights to each other.

While the three illustrated centrifugal governors of the invention have been described with reference to their functions in a dual-speed bicycle hub, they may be employed to advantage in other multiple-speed drive arrangements in which good balancing and immunity from malfunctioning under sudden acceleration transverse to the axis of rotation are important. Multiple-speed drive arrangements which can benefit from a centrifugal governor of the invention will readily suggest themselves to those skilled in the art.

It should be understood, therefore, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. In a multiple-speed drive arrangement having a rotatable input member, a rotatable output member, multiple-speed transmission means operatively interposed between said members for rotating said output member at any one of a plurality of speeds when said input member rotates at a predetermined speed, said transmission means including a clutch having two clutch elements engageable for drivingly connecting said members, and a centrifugal governor including a carrier connected to one of said members for rotation about an axis when said one member rotates, a flyweight member mounted on said carrier for pivotal movement about a pivot axis away from said axis of rotation in response to centrifugal forces generated by rotation of said carrier, yieldably resilient returning means biasing said flyweight member toward said axis of rotation, and motion transmitting means connecting said flyweight member to one of said clutch elements for engaging and disengaging said elements in response to said movement of the flyweight member, the improvement in said centrifugal governor which comprises: said motion transmitting means including a motion transmitting member mounted on said flyweight member adjacent said pivot axis, said motion transmitting member projecting from said flyweight member in the direction of said pivot axis and cammingly engaging said one element.

2. In an arrangement as set forth in claim 1, said motion transmitting member being approximately triangular in cross section at right angles to said pivot axis and having three faces extending in the direction of said pivot axis, including a cam face for engagement with said one element, said cam face being approximately radial relative to said pivot axis and approximately perpendicular to another one of said three faces.

3. In an arrangement as set forth in claim 2, said cam face being concavely arcuate in said cross section.

4. In a multiple speed drive arrangement having a rotatable input member, a rotatable output member, multiple-speed transmission means operatively interposed between said members for rotating said output member at any one of a plurality of speeds when said input member rotates at a predetermined speed, said transmission means including a clutch having two clutch elements engageable for drivingly connecting said members, and a centrifugal governor including a carrier connected to one of said members for rotation about an axis when said one member rotates, a flyweight member mounted on said carrier for pivotal movement about a pivot axis away from said axis of rotation in response to centrifugal forces generated by rotation of said carrier, yieldably resilient returning means biasing said flyweight member toward said axis of rotation, and motion transmitting means connecting said flyweight member to one of said clutch elements for engaging and disengaging said elements in response to said movement of the flyweight member, the improvement in said centrifugal governor which comprises:
   a. said motion transmitting means including a motion transmitting member mounted on said flyweight member adjacent said pivot axis, and
   b. a motion transmitting element interposed between said motion transmitting member and said one clutch element for transmitting movement between said motion transmitting member and said one clutch element.

5. In an arrangement as set forth in claim 4, said motion transmitting member being of circular cross section at right angles to said pivot axis, and pivotally engaging said motion transmitting element.

6. In an arrangement as set forth in claim 5, said flyweight having an arcuate inner face about an axis of curvature, and said motion transmitting member having a central axis substantially parallel to said pivot axis and substantially aligned with said pivot axis in a radial direction relative to said axis of curvature.

7. In a multiple-speed drive arrangement having a rotatable input member, a rotatable output member, multiple-speed transmission means operatively interposed between said members for rotating said output member at any one of a plurality of speeds when said input member rotates at a predetermined speed, said transmission means including a clutch having two clutch elements engageable for drivingly connecting said members, and a centrifugal governor including a carrier connected to one of said member for rotation about an axis when said one member rotates, a flyweight member mounted on said carrier for pivotal movement about a pivot axis away from said axis of rotation in response to centrifugal forces generated by rotation of said carrier, yieldably resilient returning means biasing said flyweight member toward said axis of rotation, and motion transmitting means connecting said flyweight member to one of said clutch elements for engaging and disengaging said elements in response to said movement of the flyweight member, the improvement in said centrifugal governor which comprises:
  a. said motion transmitting means including a motion transmitting member mounted on said flyweight member adjacent said pivot axis, and
  b. said flyweight member being formed with an opening therein, and said motion transmitting member being fixedly secured in said opening and projecting from the same in one direction only.

8. In a multiple-speed drive arrangement having a rotatable input member, a rotatable output member, multiple-speed transmission means operatively interposed between said members for rotating said output member at any one of a plurality of speeds when said input member rotates at a predetermined speed, said transmission means including a clutch having two clutch elements engageable for drivingly connecting said members, and a centrifugal governor including a carrier connected to one of said members for rotation about an axis when said one member rotates, a flyweight member mounted on said carrier for pivotal movement about a pivot axis away from said axis of rotation in response to centrifugal forces generated by rotation of said carrier, yieldably resilient returning means biasing said flyweight member toward said axis of rotation, and motion transmitting means connecting said flyweight member to one of said clutch elements for engaging and disengaging said elements in response to said movement of the flyweight member, the improvement in said centrifugal governor which comprises:
  a. said motion transmitting means including a motion transmitting member mounted on said flyweight member adjacent said pivot axis,
  b. said clutch having a pawl member and a ratchet member constituting said two clutch elements and another pawl member engageable with said ratchet member, and
  c. another flyweight member connected to said other pawl member by motion transmitting means for operating said other pawl member in response to pivotal movement of said other flyweight member on said carrier, said flyweight members being substantially identical.